United States Patent
Skogsmo et al.

(10) Patent No.: US 6,691,909 B2
(45) Date of Patent: Feb. 17, 2004

(54) SONOTRODE FOR ULTRASONIC WELDING APPARATUS

(75) Inventors: Jan Birger Skogsmo, Canton, MI (US); Larry Van Reatherford, Clarkston, MI (US); Oludele Olusegun Popoola, Novi, MI (US); Ray Jahn, Dearborn, MI (US); Vijitha Senaka Kiridena, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 09/682,727

(22) Filed: Oct. 10, 2001

(65) Prior Publication Data

US 2003/0066863 A1 Apr. 10, 2003

(51) Int. Cl.$^7$ ............... B23K 1/06; B23K 5/20; B23K 37/00; B23K 20/10
(52) U.S. Cl. ............... 228/111.5; 228/110.1; 228/4.1; 228/1.1
(58) Field of Search ............... 228/1.1, 4.1, 49.5, 228/110.1, 111.5; 156/73.1, 73.2, 73.4, 73.5

(56) References Cited

U.S. PATENT DOCUMENTS

| | | |
|---|---|---|
| 3,039,333 A | 6/1962 | Jones et al. |
| 3,291,957 A | 12/1966 | Bodine |
| 3,438,428 A | 4/1969 | Balamuth et al. |
| 3,529,660 A | 9/1970 | Obeda |
| 3,717,539 A * | 2/1973 | Roberts ............ 156/498 |
| 3,750,926 A | 8/1973 | Sakamoto et al. |
| 4,194,937 A | 3/1980 | Hashmall |
| 4,401,501 A * | 8/1983 | Stumpf ............ 156/367 |
| 4,527,727 A | 7/1985 | Renshaw |
| 4,529,115 A | 7/1985 | Renshaw et al. |
| 4,545,519 A | 10/1985 | Renshaw et al. |
| 4,572,753 A | 2/1986 | Bach |
| 4,647,325 A | 3/1987 | Bach |
| 4,798,639 A | 1/1989 | Yamaguchi |

(List continued on next page.)

FOREIGN PATENT DOCUMENTS

| | | |
|---|---|---|
| DE | 1248892 | 10/1971 |
| DE | 27 26 137 A1 | 12/1978 |
| DE | 41 01 545 A1 | 7/1992 |
| DE | 197 49 682 A1 | 5/1999 |
| DE | 200 22 186 U1 | 4/2001 |
| GB | 884306 | 12/1961 |
| GB | 2 285 943 A | 1/1995 |
| GB | 2 370 806 A | 7/2002 |
| JP | 60201928 | 12/1985 |
| JP | 63140784 | 6/1988 |
| JP | 10244381 | 9/1998 |
| JP | 2000301356 | 10/2000 |
| WO | WO 93/21000 | 10/1993 |
| WO | WO 98/41095 | 9/1998 |

OTHER PUBLICATIONS

European Search Report 02102335.
European Search Report 02102336.

*Primary Examiner*—Tom Dunn
*Assistant Examiner*—Colleen P. Cooke
(74) *Attorney, Agent, or Firm*—Raymond L. Coppiellie

(57) ABSTRACT

An apparatus and method for ultrasonically welding workpieces that reduces sonotrode adhesion during the ultrasonic welding process. The sonotrode includes a contact surface wherein a fluid is deposited on the contact surface prior to the welding process. The fluid may be applied in different ways, including providing an aperture in the contact surface of the sonotrode. In addition, the sonotrode may be cooled below the dew point of the surrounding atmosphere thus causing moisture to form on the contact surface of the sonotrode. Cooling the sonotrode to a temperature above the dew point also reduces sonotrode adhesion during the ultrasonic welding process.

17 Claims, 3 Drawing Sheets

U.S. PATENT DOCUMENTS

| | | | |
|---|---|---|---|
| 4,867,370 A | | 9/1989 | Welter et al. |
| 5,011,062 A | * | 4/1991 | Nakanishi et al. ............ 228/1.1 |
| 5,115,961 A | * | 5/1992 | Nakajima ................... 228/111 |
| 5,116,343 A | * | 5/1992 | Ams et al. .................. 606/128 |
| 5,147,082 A | | 9/1992 | Krause et al. |
| 5,242,529 A | * | 9/1993 | Riedel ..................... 156/580.1 |
| 5,575,884 A | | 11/1996 | Annehed et al. |
| 5,651,494 A | | 7/1997 | Ogino et al. |
| 5,709,823 A | | 1/1998 | Hahn |
| 5,782,575 A | | 7/1998 | Vincent et al. |
| 5,785,786 A | | 7/1998 | Suzuki et al. |
| 5,800,672 A | | 9/1998 | Boyce et al. |
| 5,921,457 A | | 7/1999 | Patrikios |
| 6,053,999 A | * | 4/2000 | Marcus ...................... 156/73.2 |
| 6,078,125 A | * | 6/2000 | Roberts ...................... 310/325 |
| 6,089,438 A | | 7/2000 | Suzuki et al. |
| 6,099,364 A | | 8/2000 | Shinchi |
| 6,148,515 A | | 11/2000 | Suzuki et al. |
| 6,176,953 B1 | | 1/2001 | Landreth et al. |
| 6,202,915 B1 | | 3/2001 | Sato |
| 6,238,503 B1 | | 5/2001 | Kakehi |
| 6,267,290 B1 | * | 7/2001 | Murdeshwar ............ 228/180.5 |
| 2002/0088525 A1 | * | 7/2002 | Jahn et al. ................. 156/73.1 |

* cited by examiner

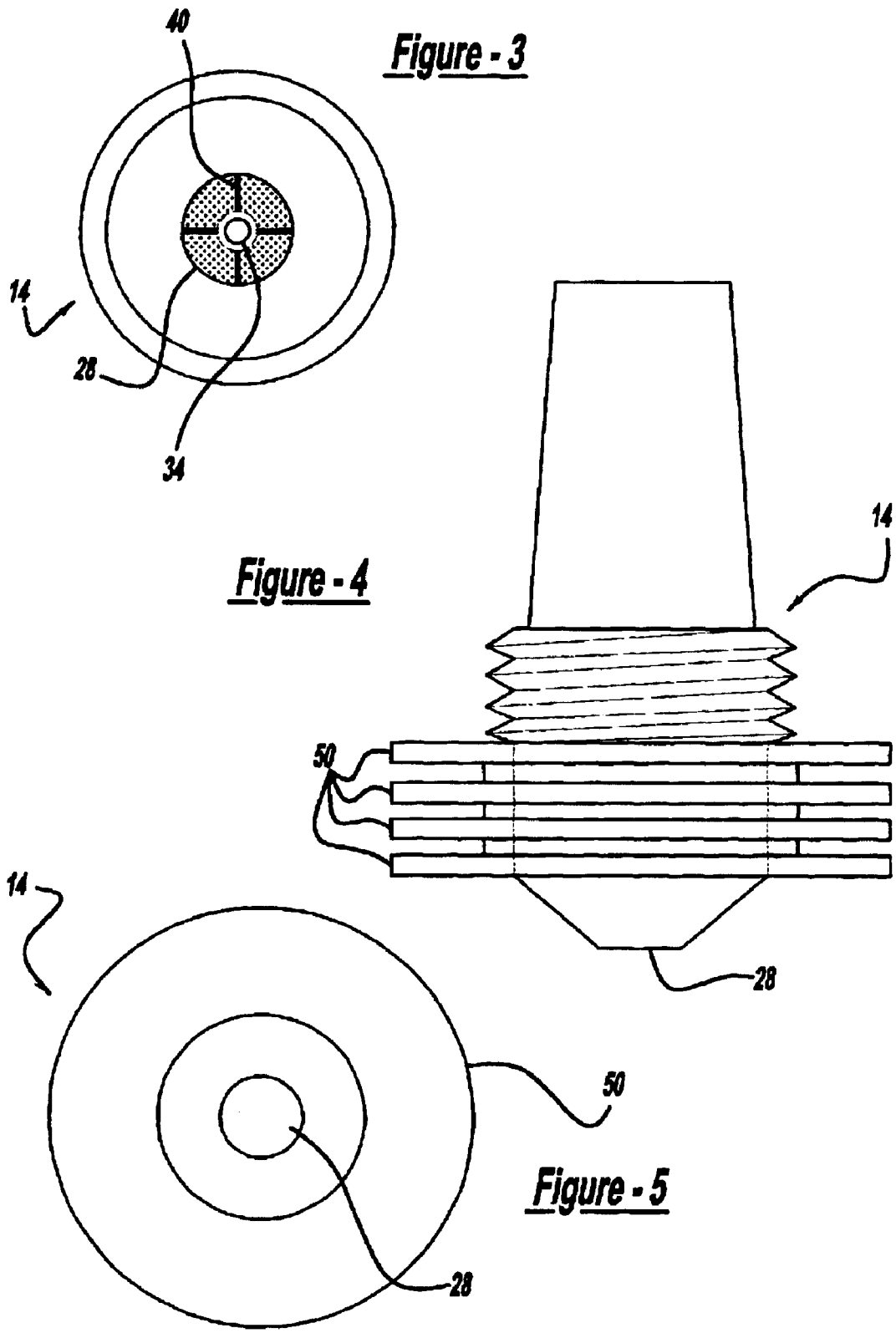

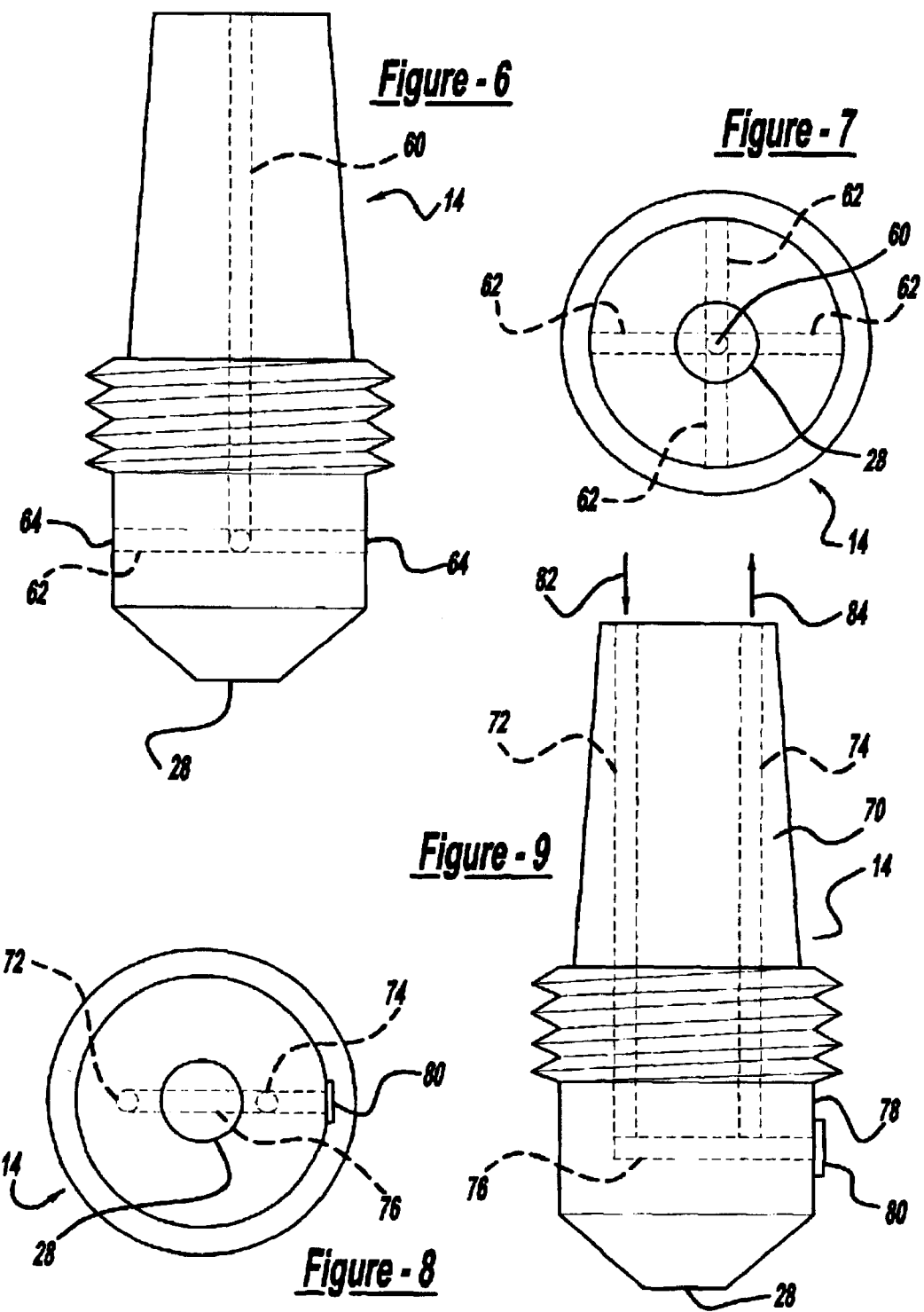

SONOTRODE FOR ULTRASONIC WELDING APPARATUS

BACKGROUND OF INVENTION

The present invention relates generally to ultrasonic metal welding and, more specifically, to an ultrasonic welding apparatus that reduces sonotrode adhesion during the ultrasonic welding process.

Ultrasonic welding of various materials is known. The process involves vibrating overlapping or adjacent workpieces clamped between a sonotrode and an anvil. Frictional forces occurring between the vibrating workpieces create a bond or weld that occurs at the interface between the workpieces, effectively joining them to one another. Accordingly, various sonotrode and anvil surface configurations, i.e., the surface that contacts the workpieces, are known and used to transfer energy from the sonotrode to the aforementioned interface. Such configurations attempt to reduce the energy loss at the sonotrode/workpiece interface or the anvil/workpiece interface thereby increasing the energy to the workpiece/workpiece interface and increasing the overall efficiency of the ultrasonic welding apparatus.

Further, it is known that when using an ultrasonic welding apparatus to weld light metals, specifically aluminum, the sonotrode or more specifically, the sonotrode adheres to the workpiece being welded. The adhesion can be so severe as to (i) damage the weld when detaching the sonotrode from the joined workpieces, (ii) cause significant and unacceptable distortion of the work piece surface, and (iii) render the sonotrode unusable for subsequent welds. Sticking or adhesion to the workpiece generally results from the sonotrode sliding on the workpiece. When the sonotrode slides, it causes galling or a buildup of material on the sonotrode.

With many of the current sonotrode designs and surface configurations, each time the sonotrode performs a weld, a small amount of aluminum is transferred unto the sonotrode. Continued welding operations cause the aluminum to build up on the sonotrode surface. The built up aluminum on the sonotrode bonds with the material of the workpiece. When this occurs, the sonotrode sticks to, or in short, becomes welded or bonded to the workpiece. Forces of up to 5kN may be required to detach the bonded sonotrode from the workpiece material. Additionally, as aluminum builds up on the sonotrode, it clogs the gripping surface of the sonotrode and reduces the efficiency of the ultrasonic welding apparatus because the energy transferred to the workpiece to perform the weld is reduced.

When the sonotrode becomes clogged, the useful life thereof is reduced. The practical consequence of this is that the sonotrode needs to be cleaned after each weld. Moreover, the surface of the welded material may be severely damaged and will require costly craftsmanship work before it will meet surface finish specifications.

Therefore, there is a need in the art to provide an ultrasonic welding apparatus designed such that it reduces aluminum/sonotrode adhesion during the ultrasonic welding process while improving the productivity, manufacturing speed and reducing equipment downtime by reducing the sticking phenomenon that is common when ultrasonically welding materials.

SUMMARY OF INVENTION

Accordingly, the present invention is an ultrasonic welding apparatus and method that reduces adhesion between the welding sonotrode and the workpiece during the welding process.

In one embodiment, a fluid is deposited on a contact surface of the sonotrode before the welding process. The fluid may be deposited in several ways all of which are within the scope of the invention. For instance, in one embodiment, the fluid travels through a passageway in the sonotrode to an aperture located on the contact surface of the sonotrode. The fluid is held within the passageway by capillary action. The contact surface may also include at least one groove thereon to aid in distributing the fluid on the contact surface.

In accordance with an additional embodiment, a cooling medium engages the sonotrode and cools the sonotrode below the dew point of the surrounding atmosphere, causing moisture to condense or form on the contact surface of the sonotrode. The cooling medium may be externally blown across the sonotrode or it may travel through various passageways located within the sonotrode.

A further embodiment utilizes the use of cooling fins connected to the sonotrode to cool the sonotrode to a lower temperature, one at which the sonotrode is less likely to stick to the workpiece.

Further, the present invention provides a method for reducing sonotrode adhesion. The method includes several steps operating alone or in combination, including the step of depositing a liquid on the contact surface of the sonotrode. This can be accomplished by using a passageway through the sonotrode to transfer liquid to the contact surface. In addition, the sonotrode and corresponding contact surface can be cooled via a cooling medium, to below the dew point of the surrounding atmosphere thereby causing moisture to condense on the sonotrode.

In addition, cooling the sonotrode before performing the welding process further prevents sonotrode adhesion. Various steps can be taken in to cool the sonotrode including the use of internal cooling passageways in the sonotrode.

Other features and advantages of the present invention will be readily appreciated, as the same becomes better understood after reading the subsequent description taken in conjunction with the accompanying drawings.

BRIEF DESCRIPTION OF DRAWINGS

FIG. 3 is a bottom view of the sonotrode of FIG. 2 according to the present invention.

FIG. 4 is a side view of an alternative embodiment of a sonotrode according to the present invention for use with an ultrasonic welding apparatus.

FIG. 5 is a bottom view of the sonotrode of FIG. 4 according to the present invention.

FIG. 6 is a side view of a further alternative embodiment of a sonotrode according to the present invention for use with an ultrasonic welding apparatus.

FIG. 7 is a bottom view of the sonotrode of FIG. 5 according to the present invention.

FIG. 8 is a bottom view of a further alternative embodiment of a sonotrode according to the present invention for use with an ultrasonic welding apparatus.

FIG. 9 is a side view of the sonotrode of FIG. 8 according to the present invention.

DETAILED DESCRIPTION

Figures 1, 2:
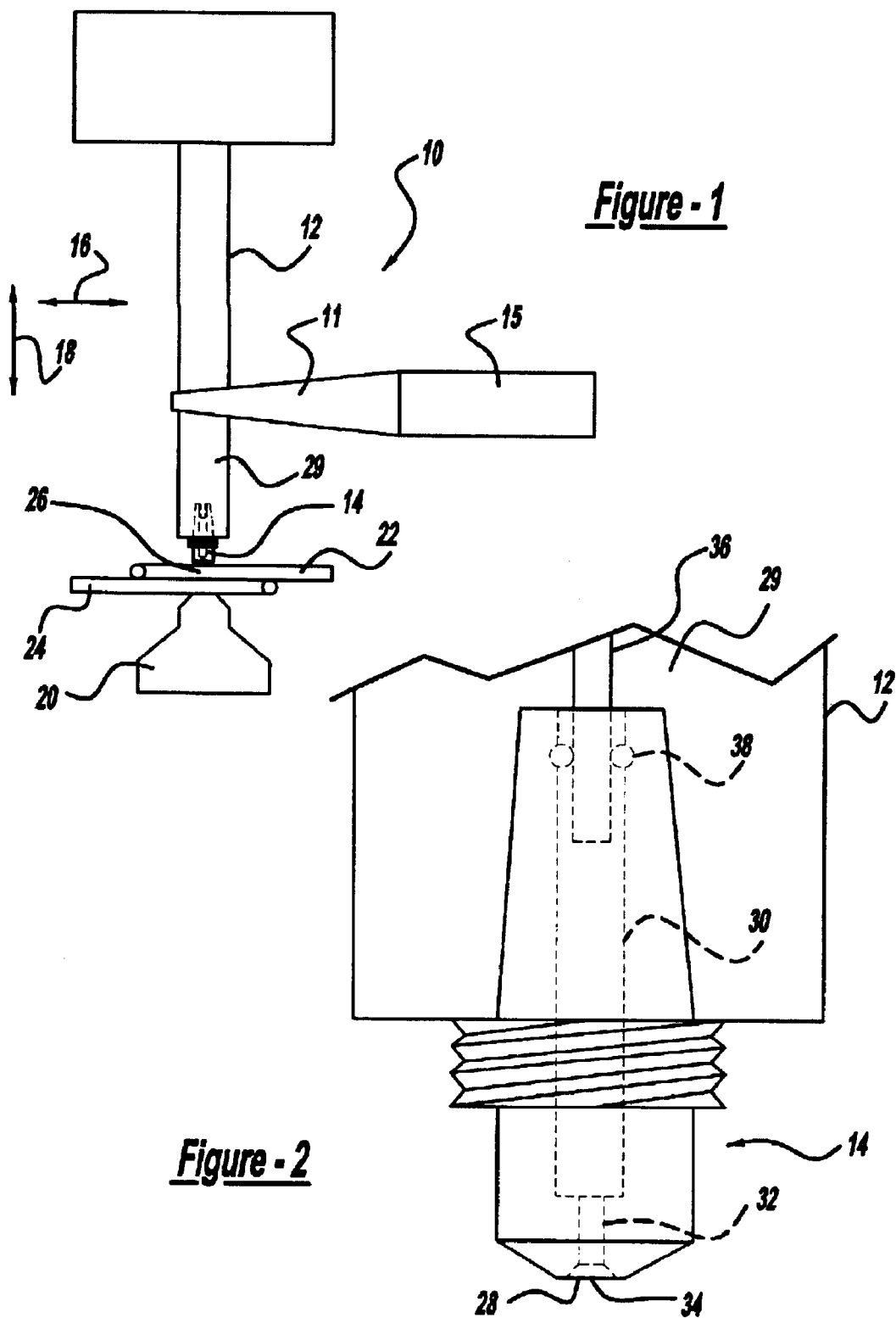
FIG. 1 is a schematic view of an ultrasonic welding apparatus utilizing a sonotrode in accordance with the present invention.
FIG. 2 is a side view of a sonotrode according to the present invention for use with an ultrasonic welding apparatus.

FIG. 1 shows a wedge-reed ultrasonic welding apparatus, seen generally at 10, according to the present invention. The ultrasonic welding apparatus 10 includes a reed 12, connected to sonotrode 14, mounted for movement in a side-to-side or horizontal direction of vibration, shown by the arrow 16. The reed 12 also moves in a vertical manner, shown by the arrow 18, and in cooperation with an anvil 20 clamps the first 22 and second 24 workpieces in position. Once the workpieces 22, 24 are clamped, a transducer 15, connected to the reed via the wedge 11, vibrates the sonotrode 14 at a high frequency (typically 15 to 40 kHz) to impart energy to the first 22 and second 24 workpieces at a location between the sonotrode 14 and the anvil 20 to create a bond or weld at the interface or adjacent surfaces 26 of the workpieces 22, 24 in accordance with known ultrasonic welding processes. As used herein the term sonotrode generally refers to the tool attached to the reed 12. In many cases, the sonotrode also includes a replaceable sonotrode tip. Accordingly, the sonotrode is the gripping tool attached to the end of the reed 12.

As shown in FIG. 2, a sonotrode 14 is inserted into the body 29 of the reed 12. Applying a liquid, such as water, in a small amount to the contact area located between the contact surface 28 of the sonotrode 14 and the workpiece 22 prior to welding the overlapping workpieces 22 and 24 helps to prevent the sonotrode 14 from sticking to the workpiece 22. One method for depositing a fluid on the contact surface 28 of the sonotrode 14 is by feeding a liquid through an aperture 34 at that contact surface 28 of the sonotrode14. One way of feeding the liquid is to provide the sonotrode 14 with an inner cavity 30. The inner cavity 30 forms a reservoir that stores a liquid. The liquid passes from the inner cavity 30 or reservoir through a capillary feed tube or passageway 32 to the contact surface 28 of the sonotrode 14. As known in the art, the contact surface 28 is the surface that contacts the workpiece 22 to impart energy to the workpieces 22, 24 to perform the weld. The capillary feed tube 32 terminates at an aperture 34 in the contact surface 28 of the sonotrode14.

A supply hose 36 extends through the body 29 of the reed 12 and into the inner cavity 30. An O-ring 38 seals the supply hose 36 within the inner cavity 30. Accordingly, as fluid exits the inner cavity or reservoir 30 through the capillary feed tube 32, the supply is replenished via the supply hose 36. As shown in FIG. 2, the liquid is supplied by gravity and capillary action. The capillary feed tube 32 is small enough to allow capillary forces to stop free-flowing of the liquid when the sonotrode 14 is not in contact with the workpiece 22. In the preferred embodiment, the holes are large enough and preferably have an angular opening 34 that will not easily the clogged by small particles picked up or located on the workpiece 22. The preferred embodiment utilizes a capillary feed tube having a diameter of about 1–1.5 mm; at about 2 mm the capillary forces are no longer active to the same extent. It should be understood that the capillary forces and correspondingly diameter of the capillary feed tube 32 will vary depending upon the type of liquid used.

In addition, the liquid may also be supplied by a low-pressure micro pump located either in the reed 12 or separate from it, wherein the supply hose 36 extends down through the reed 12. Further, the sonotrode 14 may include a plurality of apertures 34 in the contact surface 28 to aid in distribution of the liquid. If necessary, to further aid in distribution of the liquid to the entire contact surface 28, one or more grooves 40 can be formed in the sonotrode 14. In many instances, the contact surface 28 may have a knurled pattern thereon to aid in gripping the workpiece. Preferably, the grooves 40 are made slightly deeper then the knurled or gripping pattern formed on the sonotrode 14 to allow the grooves 40 to remain open during the initial stages of the ultrasonic welding process. It should be understood that the contact pressure between the contact surface 28 and the workpiece 22 stops the liquid from flowing once the welding process has started.

The means for depositing a fluid may also include an apparatus that applies a cooling medium, such as nitrogen or carbon dioxide, to the sonotrode 14. The medium would cool the contact surface 28 of the sonotrode 14 to a temperature below the dew point of the surrounding atmosphere, whereby water vapor would condense on the surface of the sonotrode 14. The moisture would affect no other part of the ultrasonic welding apparatus. The damp or wet surface would then have the non-stick properties set forth previously.

Other means for depositing moisture or fluid on the contact surface are also contemplated, including using a spray head to apply moisture to either the contact surface of the sonotrode 14 or the workpiece 22. Moisture may also be applied by dripping, brushing or pressing a wet sponge on the sonotrode 14 or workpiece 22.

Shown in FIGS. 4–8 are further embodiments of a sonotrode 14 according to the present invention including structure for cooling the sonotrode 14. FIGS. 4–5 show a sonotrode 14 having radially extending fins 50 for external airflow cooling of the sonotrode 14. The fins 50 are formed out of material that readily conducts heat away from the sonotrode 14. In addition, a separate or nearby supply of air, or some other suitable medium, may be forced through or by the fins 50 to further increase the cooling effect thereof. As shown in the additional embodiments, air or some other cooling medium may pass internally through the sonotrode 14 and exit in an area adjacent the fins 50 to further cool the sonotrode 14.

Turning now to FIGS. 6–7, there is shown a further embodiment of the present invention utilizing internal cooling passages. As shown in FIGS. 6–7, a passage 60 extends longitudinally through the center of the sonotrode 14. The passage 60 connects with a plurality of radially extending exhaust passageways 62 ending at exhaust ports 64. Preferably, the cooling fluid is an air or some other gas that is supplied via a supply hose to the passageway 60. The supply of cooling fluid may be continuous or may be supplied in short bursts that coincide with or are immediately after the welding cycle is complete. As set forth above, such cooling passages may be combined with the cooling fins 50 of the previous embodiment wherein the cooling medium flows passed the fans 50.

FIGS. 8–9, show a further embodiment of a sonotrode 14 having an internal cooling circuit 70. The internal cooling circuit 70 includes an inflow passage 72 and an outflow passage 74 connected by a transverse passage 76. As shown, the transverse passage extends inwardly from a side surface 78 of the sonotrode 14. This is for ease of manufacturing, as it provides a simple way to connect the inflow 72 and outflow 74 passages. A plug 80 seals the opening at the side surface 78. In use, the cooling medium, typically a liquid cooling fluid, flows in the inflow passage 72 in the direction shown by arrow 82, across the transverse passage 76 and out the outflow passage 74 in the direction shown by arrow 84. In this manner, fluid flowing through the sonotrode 14 acts to cool the sonotrode 14. Depending upon the cooling medium used, such and internal cooling circuit 70 may be used to cool a sonotrode 14 to a temperature below the dew point. While shown here with a single inflow 72 and outflow 74 passages, multiple passages may be used to further increase the flow of coolant through the sonotrode 14. The internal cooling circuit 70 may also be used in combination with the cooling fins 50 of the previous embodiment.

In addition, the various cooling embodiments may be combined with the fluid application embodiment such that the combination thereof further reduces the likelihood that the sonotrode 14 will stick to the workpiece 24. For instance, it is contemplated that the internal and extra cooling embodiments of FIGS. 4–9 may be used in connection with the means for depositing a fluid disclosed herein. While we do not seek to be held for rigorous scientific exactitude, we postulate that the dropletization and/or evaporation of the liquid (both of which are visible during the practice of this invention), trapped between sonotrode 14 and material 22, produce enough pressure surge to cause their separation, thus preventing sticking.

Although the wedge-reed configuration is used to describe the various embodiments of this invention, it is to be understood that the terminology that has been used is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. An ultrasonic welding apparatus comprising:
   a sonotrode;
   said sonotrode having a contact surface, said contact surface having an aperture formed therein;
   said sonotrode further including an inner cavity formed therein; and
   a passageway contained within and fully extending through said sonotrode from said inner cavity to said aperture formed in said contact surface.

2. An ultrasonic welding apparatus as set forth in claim 1 including a supply hose connected to said inner cavity.

3. An ultrasonic welding apparatus as set forth in claim 1 wherein said passageway forms a capillary feed tube for transferring a fluid from said inner cavity to said aperture formed in said contact surface.

4. An ultrasonic welding apparatus as set forth in claim 3 wherein said capillary feed tube has a diameter of 1–1.5 mm.

5. An ultrasonic welding apparatus as set forth in claim 1 wherein said contact surface includes at least one groove thereon, said groove communicating with said aperture.

6. An ultrasonic welding apparatus as set forth in claim 5 wherein said contact surface has a gripping pattern formed thereupon and said groove is formed in said contact surface at a depth greater than the depth of the gripping pattern.

7. An ultrasonic welding apparatus comprising:
   a sonotrode, including a contact surface; and
   a plurality of fooling fins connected to said sonotrode.

8. An ultrasonic welding apparatus as set forth in claim 7 wherein the said plurality of cooling fins connected to said sonotrode extend radially outward from said sonotrode.

9. An ultrasonic welding apparatus as set forth in claim 7 including means for a fluid on said contact surface.

10. An ultrasonic welding apparatus as set forth in claim 7 including an internal cooling passage, said internal cooling passage including at least one radially extending exhaust passageway, said exhaust passageway ending at an exhaust port located on an outer surface of said sonotrode.

11. An ultrasonic welding apparatus as set forth in claim 7 including an internal cooling passage, said internal cooling passage including an inflow passage and an outflow passage cooperating together to form an internal cooling circuit.

12. A method for reducing adhesion of a sonotrode to a workpiece during an ultrasonic welding process comprising the steps of:
    providing a sonotrode, said sonotrode including a contact surface for contacting a contact area on a workpiece; and
    applying a liquid to at least one of the contact area and the contact surface prior to the ultrasonic welding process.

13. A method for reducing adhesion of a sonotrode to a workpiece during an ultrasonic welding process as set forth in claim 12 wherein the step of applying a liquid includes the steps of:
    providing an aperture in the sonotrode;
    feeding liquid from a reservoir to the aperture such that the liquid is located adjacent the contact surface of the sonotrode; and
    distributing the liquid on the contact surface of the sonotrode prior to the sonotrode contacting the contact area of the workpiece.

14. A method for reducing adhesion of a sonotrode to a workpiece during an ultrasonic welding process as set forth in claim 13 wherein said method includes the step of stopping the liquid from feeding to the aperture using capillary action prior to the sonotrode contacting the contact area of the workpiece.

15. A method for reducing adhesion of a sonotrode to a workpiece during an ultrasonic welding process as set forth in claim 12 wherein the step of applying a liquid to the contact area includes the step of cooling at least a portion of the sonotrode below the dew point of the surrounding atmosphere.

16. A method for reducing adhesion of a sonotrode to a workpiece during an ultrasonic welding process as set forth in claim 15 wherein the step of cooling said sonotrode below the dew point includes the step of passing a cooling medium over the contact surface of the sonotrode.

17. A method for reducing adhesion of a sonotrode to a workpiece during an ultrasonic welding process as set forth in claim 15 wherein the step of cooling the sonotrode below the dew point includes the step of feeding a cooling medium through internal passageways within the sonotrode.

* * * * *